(12) United States Patent
Kmiec et al.

(10) Patent No.: US 11,055,775 B2
(45) Date of Patent: Jul. 6, 2021

(54) SECURE CONSOLIDATED EXCHANGE FEED FOR ORDER ENTRY AND MARKET DATA

(75) Inventors: Frank Kmiec, Cary, IL (US); Ari Studnitzer, Northbrook, IL (US); Donald Mendelson, Des Plaines, IL (US); Zachary Bonig, Skokie, IL (US); Priteshkumar Soni, Elgin, IL (US); Arkadiusz Koziol, Glenview, IL (US); Jacques Doornebos, Riverside, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 13/399,364

(22) Filed: Feb. 17, 2012

(65) Prior Publication Data

US 2013/0218739 A1 Aug. 22, 2013

(51) Int. Cl.
*G06Q 40/04* (2012.01)

(52) U.S. Cl.
CPC .................................. *G06Q 40/04* (2013.01)

(58) Field of Classification Search
CPC ........ G06Q 40/00; G06Q 40/02; G06Q 40/04; G06Q 40/06; G06Q 40/08; G06Q 40/025; G06Q 20/10; G06Q 30/08
USPC ................................. 705/35, 36 R, 36 T, 37
See application file for complete search history.

(56) References Cited

U.S. PATENT DOCUMENTS

| | | | |
|---|---|---|---|
| 7,426,721 B1* | 9/2008 | Saulpaugh et al. | 717/144 |
| 2002/0128945 A1* | 9/2002 | Moss | G06Q 40/04 705/37 |
| 2002/0161994 A1* | 10/2002 | Cromer | G06F 21/6245 713/2 |

(Continued)

OTHER PUBLICATIONS

Yanding Zhao, Evelien Schaafsma, Chao Cheng; "Applications of ENCODE data to systematic analyses via data integration"; Current Opinion in Systems Biology, vol. 11, 2018, pp. 57-64.*

(Continued)

*Primary Examiner* — Gregory A Pollock
(74) *Attorney, Agent, or Firm* — Lempia Summerfield Katz LLC

(57) ABSTRACT

Systems and methods for communication of financial messages from an Exchange to market participants whereby messages directed to particular market participants may be consolidated with other messages directed to all market participants and communicated via the same communications medium while preserving the anonymity of those market participants to which messages are particularly directed. Accordingly, redundant communications are eliminated, reducing the overall volume of communicated data and the resources necessary in support thereof; inhibition of any one market participant intentionally or unintentionally influencing the market via exposure of their activities, or otherwise unfairly impinging on the exposed activities of other market participants, is maintained; and inequitable information access is eliminated as the consolidated messages are transmitted to all market participants substantially (Continued)

A Single Consolidated Order Entry and Market Data Message Feed from an Electronic Trading Exchange simultaneously over the same medium thereby minimizing or eliminating any advantage or opportunity one market participant may have to receive market information ahead of the other market participants.

35 Claims, 5 Drawing Sheets

(56) References Cited

U.S. PATENT DOCUMENTS

2011/0071958 A1* 3/2011 Grody et al. ............... 705/36 R

OTHER PUBLICATIONS

International Preliminary Report on Patentability, from PCT/US2013/025665, dated Aug. 19, 2014, WO.
International Search Report and Written Opinion from PCT/US13/25665 dated Mar. 14, 2013.
Extended European Search Report, from EP Applicatiion No. 13749436.5, dated Sep. 18, 2015, EP.

* cited by examiner

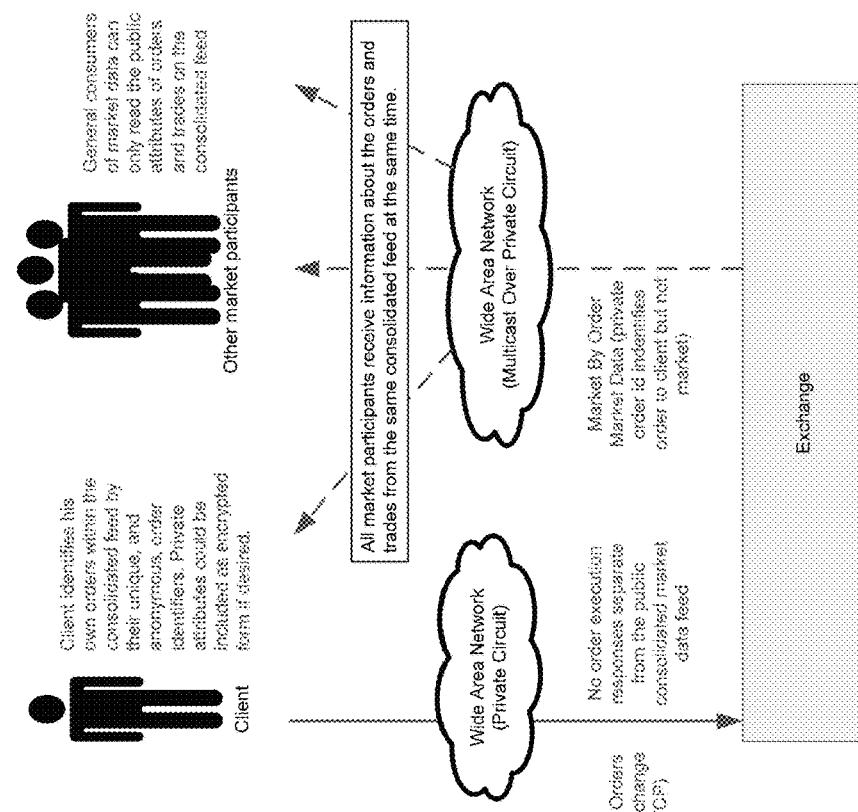

SECURE CONSOLIDATED EXCHANGE FEED FOR ORDER ENTRY AND MARKET DATA

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a network. These "electronic" marketplaces have largely supplanted the pit based trading systems whereby the traders, or their representatives, all physically stand in a designated location, i.e. a trading pit, and trade with each other via oral and hand based communication. Anyone standing in or near the trading pit may be privy to the trades taking place, i.e. both who is trading and what they are trading, allowing, for example, one participant to derive and/or undermine another participant's trading strategy and thereby garner an unfair advantage or otherwise skew the market. Electronic trading systems, in contrast, ideally attempt offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by separating and restricting the communication of private data, e.g. orders and the responses thereto, from public data, e.g. market data, prices, etc. published to all participants. However, as more traders place more trades, the volume of data being communicated increases as well, increasing the burden on the communication infrastructure and supporting resources that are used to generate and transmit the communications in this manner.

BRIEF SUMMARY

The disclosed embodiments relate to communication of financial messages from an Exchange, such as the Chicago Mercantile Exchange ("CME"), to market participants whereby messages directed to particular market participants may be consolidated with other messages directed to all market participants and communicated via the same communications medium while preserving the anonymity of those market participants to which messages are particularly directed. In this way, redundant communications are eliminated, reducing the overall volume of data being communicated and the resources necessary in support thereof. In addition, inhibition of any one market participant intentionally or unintentionally influencing the market via exposure of their activities, or otherwise unfairly impinging on the exposed activities of other market participants, is maintained. Further, inequitable information access is eliminated as the consolidated messages are transmitted to all market participants substantially simultaneously over the same medium thereby minimizing or eliminating any advantage or opportunity one market participant may have to receive market information ahead of the other market participants.

BRIEF DESCRIPTION OF THE DRAWINGS

FIG. 5A depicts a block diagram of a prior system for communicating orders, responses, market data and other market related information.

FIG. 5B depicts a block diagram of an exemplary system for communicating orders, response, market data and other market related information according to one embodiment.

DETAILED DESCRIPTION

Figure 1:
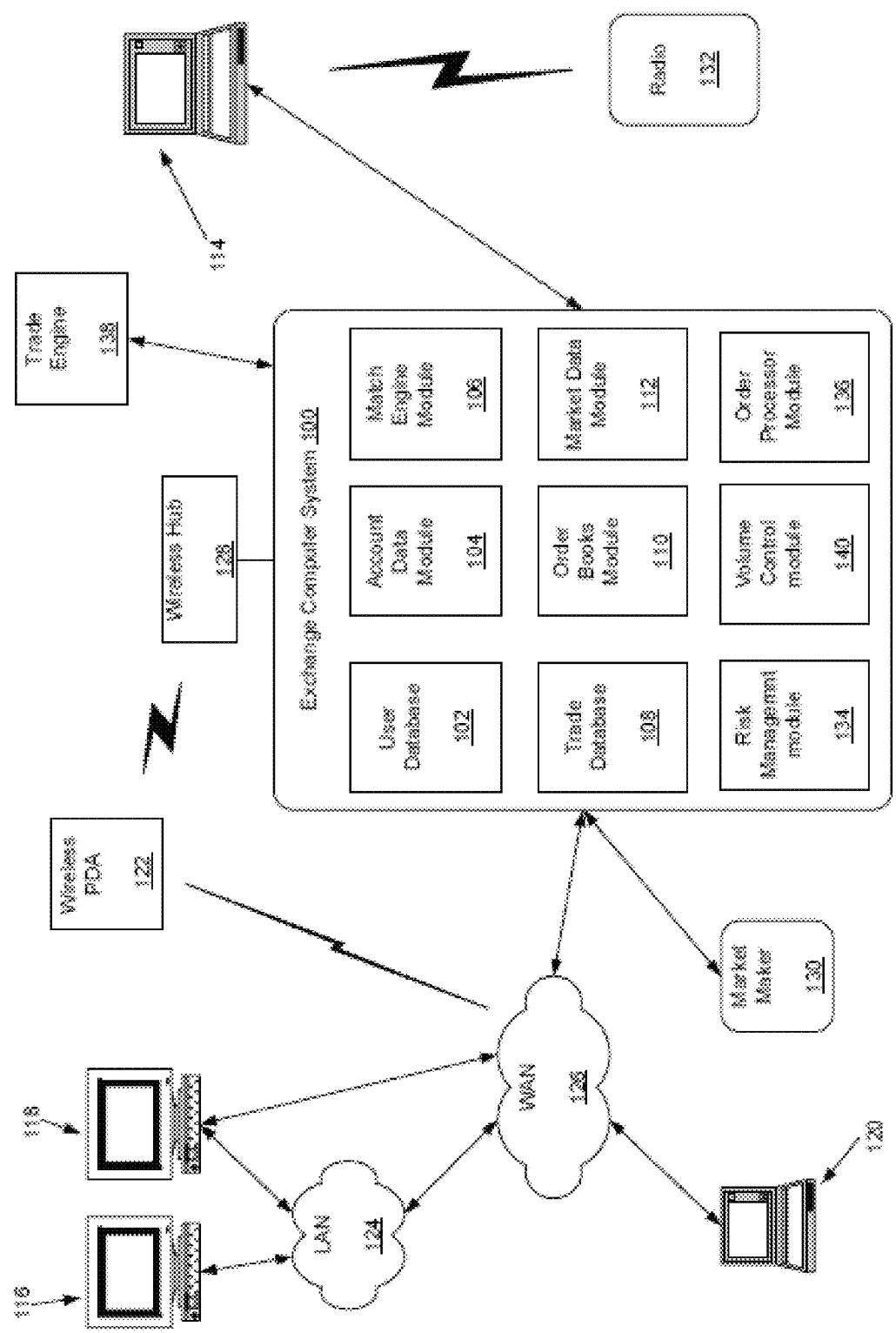
FIG. 1 depicts an illustrative computer network system that may be used to implement aspects of the disclosed embodiments.

The disclosed embodiments relate to communication of financial messages from an Exchange, such as the Chicago Mercantile Exchange ("CME"), to market participants whereby messages directed to particular market participants may be consolidated with other messages directed to all market participants and communicated via the same communications medium while preserving the anonymity of those market participants to which messages are particularly directed. In this way, redundant communications are eliminated, reducing the overall volume of data being communicated and the resources necessary in support thereof. In addition, inhibition of any one market participant intentionally or unintentionally influencing the market via exposure of their activities, or otherwise unfairly impinging on the exposed activities of other market participants, is maintained. Further, inequitable information access is eliminated as the consolidated messages are transmitted to all market participants substantially simultaneously over the same medium thereby minimizing or eliminating any advantage or opportunity one market participant may have to receive market information ahead of the other market participants.

While the disclosed embodiments may be discussed in relation to futures and/or options on futures trading, it will be appreciated that the disclosed embodiments may be applicable to any equity, options or futures trading system or market now available or later developed. It will be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g. that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated. As depicted in FIG. 5A, in such systems, incoming orders and other requests and the outbound responses thereto are typically communicated via a medium, e.g. a channel or connection, referred to as a "feed," that is separate from the market information feed which is generally broadcast to all of the market participants. This generally prevents any one market participant from monitoring the specific trading activities of another market participant and prevents, for example, any one participant from influencing other market participants and/or deriving and/or undermining another participant's trading strategy and thereby garnering an unfair advantage or otherwise allowing them skew or influence the market. Unfortunately, the implementation of two separate communications paths requires additional hardware and software infrastructure to support adding additional cost to the implementation of the electronic trading system. Further, costs, in the form of subscription and other transactional fees, are typically imposed on the market participants for access to these feeds, often separately for each feed.

The disclosed embodiments recognize, however, that the market data messages, e.g. order book updates, are typically responsive to incoming messages from market participants, e.g. price update messages sent in response to trade orders, etc., which may have been received at any prior time. Accordingly, a given market data message broadcast to all market participants in response to an incoming request message may be duplicative of a response message sent specifically to the sender of that request message who is also receiving the broadcasted market data message. The duplicative, and arguably redundant, communications requires a complex infrastructure, is inefficient, consumes unnecessary communications bandwidth and other resources as well as introduces potential inequities in information access, i.e. inconsistent market views, due to the potential for communications errors and variation in communications latencies over the separate communications channels. For example, a market participant submitting a request, such as a new trade order, order modification, or order cancellation, which impacts the market, e.g. causes a change in price of one or more traded products, may receive confirmation of the processing of their request before the remaining market participants learn of the impact via an update to the market data. This discrepancy, which may be on the scale of milliseconds. microseconds or oven nanoseconds, may allow the submitting market participant to unfairly take advantage of the market impact, such as by submitting additional orders, etc., before the remaining market participants can react.

Solutions to the inefficiencies and inequities described above include generally reducing the requisite bandwidth of the communications, such as via encoding or compression mechanisms, and introducing mechanisms, such as buffers, to align, equalize or otherwise normalize the latencies of the separate communications paths. However, while reducing the bandwidth required for each of the feeds attempts to address inefficiency, such reductions fail to address the fundamental inefficiency of reporting a single transaction twice. Further, attempts to achieve parity in terms of latency between two different data feeds publishing the same data has generally been a "best effort" solution, by comparison to simply sending a single message from the trading engine as, while inherent latencies may be accounted for, it is difficult, for example, to account for transient events, such as errors or interference, which may introduce additional and likely substantially random latencies. Further, it will be appreciated that regulators are motivated to seek parity between those latencies, whereas market participants seeking a trading advantage are motivated by a timing advantage in order entry timing relative to market data. The discrepancies lead market participants to attempt to game the market and regulators to impose onerous regulations in a counter-attempt thereto.

As used herein, a financial message refers both to messages communicated by market participants to an electronic trading system and vice versa. Financial messages communicated to the electronic trading system, also referred to as "inbound" messages, may include request messages, such as trader orders, order modifications, order cancellations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market, also referred to as an "order book" or "book," for a traded product, such as a prevailing price therefore, etc., or not having or reflecting an impact on a market or a subset or portion thereof. For example a request to place a trade may result in a response indicative of the trade either being matched with, or being rested on an order book to await, a suitable counter-order. In some cases, requests may elicit a non-impacting response, such as temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein. It will be appreciated that additional conditions may be specified, such as a time or price limit, which may cause the order to be dropped or otherwise canceled and that such an event may result in another non-market-impacting communication instead. As will be described below, in some implementations market impacting communications may be communicated separately from non-market impacting communications, such as via a separate communications channel or feed. It will be further appreciated that various types of market data feeds may be provided which reflect different market or aspects thereof. Market participants may then, for example, subscribe to receive those feeds of interest to them. For example, a particular market data feed may only communicate information related to the top buy/sell prices for a particular product, referred to as "top of book" feed. In this case, a request message may be considered market-impacting only if it affects the top buy/sell prices and otherwise is considered non-market-impacting. As market impacting communications tend to be more important to market participants then non impacting communications, this separation may reduce congestion and or noise among those communications having or reflecting an impact on a market or portion thereof. Generally, the disclosed embodiments relate to consolidation of the communication of market impact reflecting response messages, e.g. responsive to inbound messages, with other market impact reflecting messages as will be described. In other implementations, these communications may or may not be further consolidated with non-market impacting messages.

Market data feeds may further be characterized as providing a "view" or "overview" of a given market, an aggregation or a portion thereof. For example, a market data feed may convey the entire state of a market for a particular product, e.g. all presently resting buy/sell orders and prices associated therewith as well as trade notifications, etc., only a portion of a market, e.g. only the top 10 resting buy/sell orders, and/or an aggregation of multiple markets or portions thereof. As used herein, a market impacting request may be said to impact the "view" of the market as presented via the market data feed.

Various types of market data feeds may be provided by electronic trading systems, such as the CME, in order to provide different types or subsets of market information or to provide such information in different formats. Examples include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index). It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available of later developed, are contemplated herein.

Generally, as shown in FIG. 5B, the disclosed embodiments eliminate the need for a separate communications feed to transmit a separate response, such as a confirmation message, to a market participant, sent in response to the acceptance and/or processing of a market impacting request message sent thereby, by augmenting the outbound market update message, generated based on the acceptance and processing of the request and reflecting the market impact of the request, sent to all market participants, such as via a "by order" market data feed, with a unique identifier, also referred to as a token. The unique identifier, known only to the submitting market participant and/or their designees, as will be described, allows that market participant to recognize the market update message as further confirming the acceptance and/or processing of their request or otherwise being associated therewith. However, other market participants, to which the unique identifier is unknown, are only privy to the market impact reflected in the message but otherwise cannot discern which market participant submitted the underlying request.

In one embodiment, market participants may generate their own unique identifiers and include them with their request messages while also keep a record or other accounting of which request message corresponds with which unique identifier. For example, market participants may generate the unique identifiers using a common algorithm, such as a "Universally Unique Identifier" (UUID), as specified in Request for Comments: 4122 of the Internet Engineering Taskforce. See http://www.ietf.org/rfc/rfc4122.txt. In this case, since a market participant originated the unique identifier, it would remain confidential to that market participant. To ensure security, the electronic trading system may require that seed or key values be changed periodically, such as daily. When generating the outbound message responsive to a particular request, the electronic trading system may then copy the unique identifier from the underlying request and augment the outbound message with it. The market participant, upon receipt of the outbound message, may then correlate the unique identifier with their accounting to further associate the outbound message with the corresponding request message.

As will be appreciated, to ensure anonymity, the unique identifiers must be unique to each market participant and unknown to other market participants. Further, to minimize the chance that market participants, while not knowing who the outbound messages are associated with, may observe, discern, or otherwise derive patterns of behavior of any one market participant from the flow of outbound messages which may prove advantageous as described above, the unique identifiers may further be unique to each outbound message. In one embodiment, the unique identifiers are arbitrary and themselves convey no information about the market participants or request messages they may be associated with.

In one embodiment, the electronic trading system generates, e.g. randomly, the unique identifiers and then allocates, e.g. randomly, unique identifiers to each market participant to use with their requests. The unique identifiers may be generated and/or allocated upon request, in advance, or combinations thereof. In one implementation, a secure interface is provided by which a market participant may request one or more unique identifiers be allocated to them which are then securely communicated so as to protect the anonymous integrity thereof. For example, at the beginning of each trading day, each market participant may log in to a secure server via a network and download an allocation of unique identifiers. The number of unique identifiers allocated to a particular market participant may be implementation dependent and may be limited as will be described below. For example, the number of allocated unique identifiers may range anywhere from 1 to 250,000 or more depending upon the expected and/or desired message volume of the market participant and other factors and may be different for different market participants. Alternatively, unique identifiers may be generated and/or allocated on an as needed basis throughout the trading day. It will be appreciated that there may be numerous methodologies, e.g. true random or pseudo-random, which may be used to define the structure, e.g. size and format, of the unique identifiers and further randomly generate and further randomly allocate the generated unique identifiers to ensure that a sufficient number of unique identifiers are available for the expected message volume within a particular period, i.e. without being reused, and that it is substantially unlikely that any market participant may derive a relationship among an allocation of unique identifiers or the association of an allocation with a market participant. In one embodiment, unique identifiers comprise a 128 or 256 bit numeric value. The unique identifiers may comprise a numeric, alphanumeric and/or binary value. In one embodiment, unique identifiers may be reused, e.g. randomly reallocated, on a periodic basis, such as each trading day, or annually.

In one embodiment, rather than allocate a set of unique identifiers to each market participant, each market participant may instead be allocated a seed or key value which may be used with a known algorithm to generate the unique identifiers as needed.

In one embodiment where the market participant is required to include a unique identifier with each of their requests, which is then subsequently used by the electronic trading systems to augment the outbound messages responsive thereto, and further where the unique identifier is not used as a mechanism to limit requests, as will be described below, the electronic trading system need not track the use of unique identifiers, once allocated, simplifying the implementation thereof. Instead, it may be the responsibility of the market participant to ensure that each unique identifier is used only once as prescribed. In an alternative embodiment, the electronic trading system may implemented a limited verification mechanism to ensure that one market participant does not intentionally or inadvertently utilize an identifier allocated to another market participant, such as the encryption of the identifiers as described elsewhere herein.

In one embodiment, rather than the market participant including a unique identifier with each request, the electronic trading system may maintain a copy of the market participants' allocations and, for each suitable outbound message, select a unique identifier from the appropriate market participant's allocation, randomly or in a defined sequence. The market participants then check the unique identifiers of the outbound messages against their allocation to determine if the outbound message is associated with one of their requests. While this may impede the ability to correlate specific requests with specific outbound messages, it may improve the security of the communications by preventing interception of the request messages to discern the unique identifiers associated therewith. It will be appreciated that other data may be added to the outbound message to allow a market participant to correlate the outbound message with the underlying request message once they have determined that the outbound message is associated with one of their requests. Such data may include a time/date stamp, a serial number or some other data which, while not unique among market participants, is unique among the request messages sent by any one market participant.

In one embodiment, instead of a unique identifier as described above, request messages instead include a unique encryption key, such as a symmetric encryption key, which is randomly generated as described above or generated based on a key or seed value. The electronic trading system, in constructing the outbound message, utilizes the unique encryption key to encrypt identifying or other private information that is included with the outbound message. Market participants may be requested to rotate their seed/key values periodically to ensure security. While encryption schemes may be vulnerable, it will be appreciated that sufficient strength may be provided to ensure that the encrypted data may not be deciphered within sufficient time as to be useful given the speed at which financial markets change.

In prior market feed systems where confirmations and other responsive messages were conveyed separately to the market participant, the responsive message often include additional "private" information such identification of the market participant's firm, account and trader identification data, quantity information, etc. In the implementations described above, the outbound messages would no longer convey this private information in favor of only the unique identifier requiring the market participant to infer or otherwise derive this information from their own records or order books. In an alternative embodiment, private information may be included in the outbound message, such as in an encrypted form. The private data, for example, may be encrypted using public key cryptography or may be encrypted as part of the encrypted unique identifier as described above.

In one embodiment, unique identifiers, i.e. dummy or decoy unique identifiers, may be included with outbound messages that have no relation to a previously received request message so as to further normalize the format and/or appearance of messages and/or obfuscate, and improve the security for, those outbound messages which are responsive to a previously received request. Further, unique identifiers may be used, as described above, to implement one-way communication between the electronic trading system and a particular market participant, e.g. to convey messages to specific market participants which are non-market impacting and non-responsive to a request, such as a general informational or account related message which may be only meaningful to the market participant associated with the unique identifier. Further, responsive outbound messages which are non-market impacting, such as an order rejection or cancellation message, may also be communicated using a unique identifier as described above, allowing the electronic trading system to minimize the size of the message. For example, a message simply containing the word "rejected" along with a unique identifier could let the associated market participant know that the associated request was rejected. This may further minimize bandwidth usage.

It will be appreciated that where a market participant desires or is required, or the electronic trading system is otherwise required, to share access to their activities with other entities, such as their back office, a clearing firm, trading partner, regulatory entities such as the CFTC, SEC, etc., they need only share their allocation of unique identifiers, or a subset thereof. In one embodiment, to further facilitate sharing, multiple unique identifiers and/or overlapping allocations may be utilized with each outbound message where each unique identifier ascribed to a given outbound message is known to a different entity. For example, where the electronic trading system is required, such as via warrant, to allow a regulatory or law enforcement agency to monitor activities of a market participant with or without the knowledge thereof, access to the allocated unique identifiers may be provided and/or overlapping allocations may be utilized as described.

In one embodiment, restrictions on the number of unique identifiers allocated to a market participant may serve as a mechanism by which the message volume of that market participant may be limited. In such an implementation, requests subject to a limited volume would be required to include one of the allocated unique identifiers which has not been previously used. A request not including such a unique identifier when required to do so would be rejected. It will be appreciated that such a mechanism for limiting message volume may be used in conjunction with other volume limiting mechanisms.

As was described above separate data feeds may still be provided for communicating non-market-impacting messages and/or messages which would not otherwise be communicated by the particular market data feed. In one embodiment, a separate data feed may be maintained for responses to order entry requests that do not result in a change to the Exchange order books. For example, the feed would contain, but not be limited to, any variety of administrative response to a market participant request, any variety of rejection of a market participant request, such as an order rejection, rejection of a user-defined instrument creation request, or any variety of status response, such as an order status report or risk limit status report. The separate data feed may be another common public feed leveraging unique identifiers as described above, or the data may be routed over a dedicated order entry response feed to the market participant that originated the request.

In particular, for aggregate market data feeds which present a particular subset of market data, only outbound messages, having unique order identifiers as described above, reflecting an impact on the particular subset of market data, e.g. the particular aggregate market view, would be included so that all market observers would see the same view of the market at the same time. In cases where a request does not affect the aggregate market order book being published, the outbound message, e.g. the order confirmation, would be sent back to the market participant on a separate customer-specific order response feed, which may be a traditional bidirectional communication channel for order entry.

Generally, the disclosed secure consolidated exchange feed for order entry and market data reduces trading engine latency by sending a single response combining the response to a particular request with the public broadcast of the market impact thereof. This consolidation effectively reduces outbound message flow by 50 percent, benefiting the exchange and customers, simplifies global message routing issues since all outbound message routing is effectively just market data, achieves parity between market data and order entry response latency as there is only one feed and eliminates certain regulatory concerns in that regard. Further, the need for a separate feed to copy execution response messaging to a second client interface, typically back-office, for risk management purposes, referred to by some electronic trading systems as DropCopy, may be eliminated. Further, Order Replay and Market Data replay can be reduced to a single feed, eliminating the need for order entry response replay (e.g. FIX Resend Request support), and monitoring (everything by product), surveillance (brings market state and order information together) and risk controls may be distributed and simplified through the market-oriented view provided by the consolidated response feed. In addition, the disclosed embodiments permit market participants to focus their efforts on the consumption/processing of a single consolidated feed instead of having to consume and combine information from order entry responses and market data before making their next move. They will be able to see their order's execution response embedded in the market data feed, giving exact position and timing relative to the rest of the market.

Figure 4:
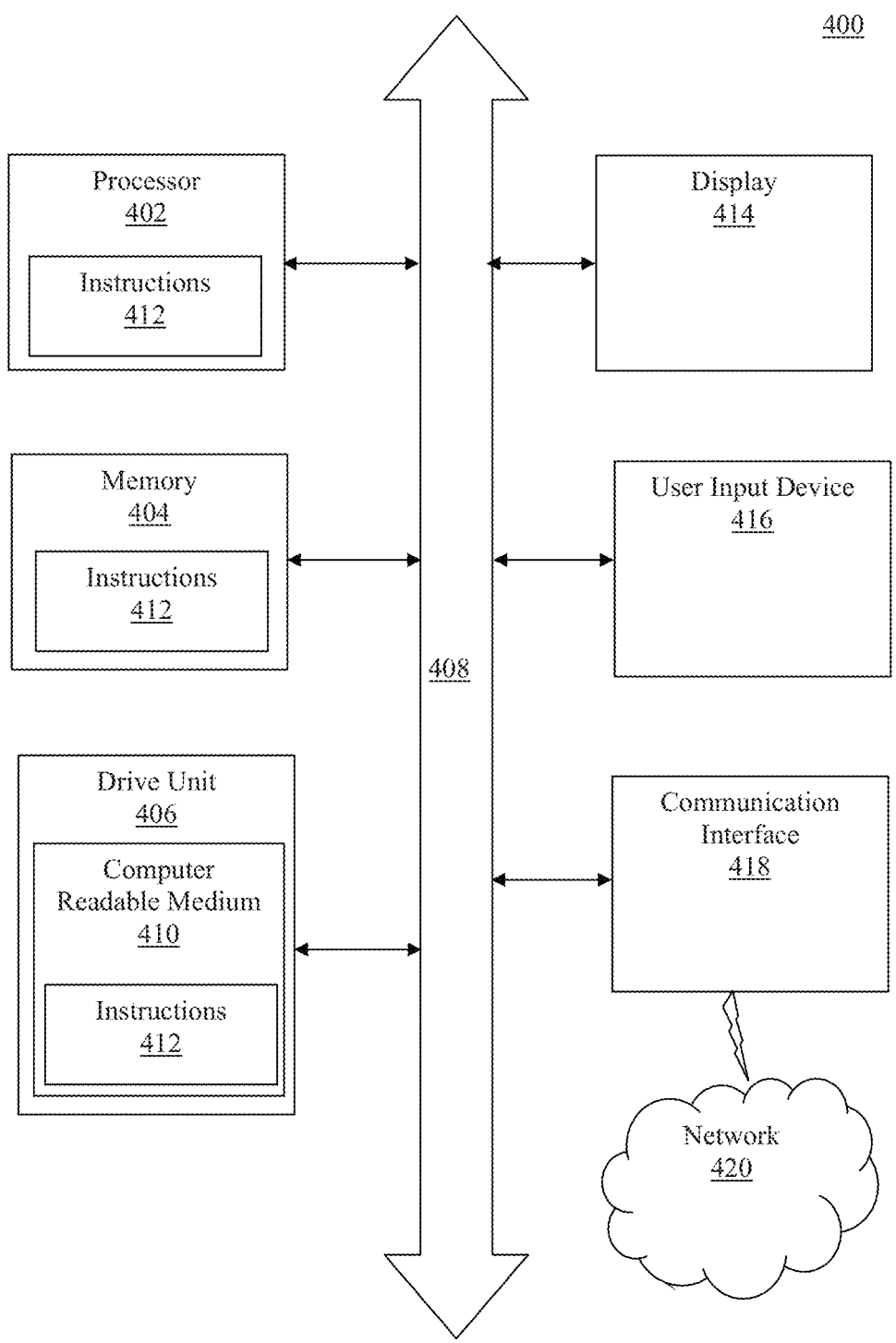
FIG. 4 shows an illustrative embodiment of a general computer system for use with the system of FIGS. 1 and 2.

In accordance with aspects of the disclosure, systems and methods are disclosed for generating and allocating unique identifiers and augmenting outbound financial messages in accordance therewith The disclosed embodiments are preferably implemented with computer devices and computer networks, such as those described with respect FIG. 4, that allow users, e.g. market participants, to exchange trading information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
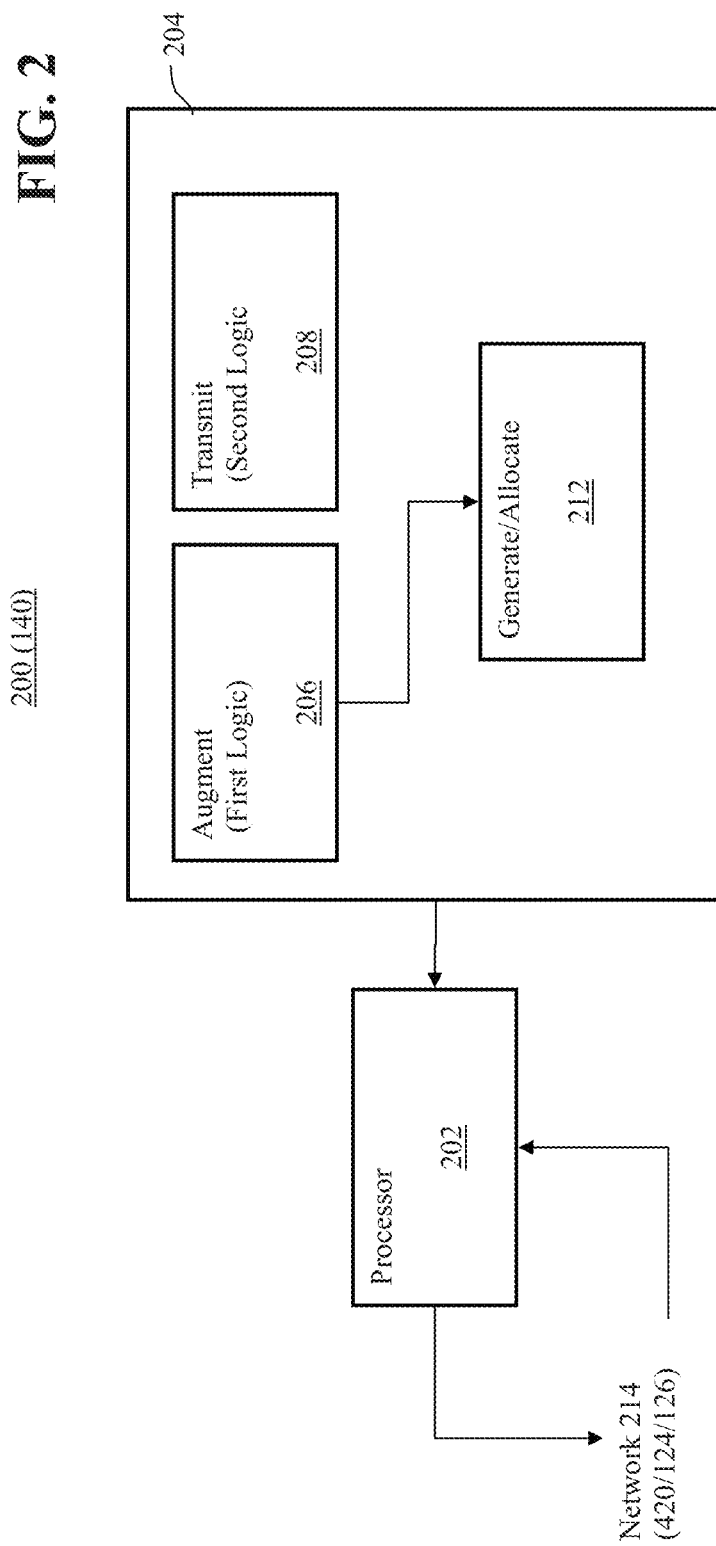
FIG. 2 a block diagram of an exemplary implementation of the system of FIG. 1 for managing communications of financial messages.

As shown in FIG. 1, the Exchange computer system 100 further includes a consolidated feed module 140 which may implement, in conjunction with the market data module 112, the disclosed mechanisms as will be describe with reference to FIG. 2. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 2 depicts a block diagram of an consolidated feed module 140 according to one embodiment, which in an exemplary implementation, is implemented as part of the exchange computer system 100 described above. The embodiments described herein utilize trade related messages such as mass quote messages, individual order messages, cancellation messages, etc. In alternative embodiments individual orders may be processed and produce market data that is compiled into a single market data message. A variety of criteria may be used to group orders that produce market data that is ultimately compiled into a single market data message. For example, orders received within a predetermined time period or orders for similar financial instruments received within a predetermined time period may be grouped together such that the resulting market data is transmitted within a single market data message. A mass quote message may contain a plurality of orders for at least one financial instrument. The mass quote message may also be associated with a session which may be defined as a connection with the exchange computer system 100. A session may be associated with a unique session identifier. The identifier may be assigned to a trading entity, such as a trader, i.e. a terminal used thereby, or a collection of traders, such a gateway device used thereby, for a trading period. The trading entity may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

FIG. 2 shows a system 200 for management of communication of a plurality of financial messages to a plurality of market participants via a network 214 which, as described above, may be the network 420 described below or network 124 or 126 described above, which may be implemented as a consolidated feed module 140 as described above. The plurality of messages may include a first financial message responsive to a first request message previously received from a first market participant, the first financial message including data intended to be received by the plurality of market participants, the first financial message intended to be identified by at least the first market participant of the plurality of market participants as being associated therewith and responsive to the first request message, the other market participants of the plurality of market participants being unable to identify the first market participant or the association of the first financial message therewith. It will be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in there entirety. Further, the disclosed consolidated market data feed may be delivered by an open message standard implementation, such as FIX or FIX/FAST, or by an Exchange-provided API.

The system 200 includes a processor 202 and a memory 204 coupled therewith which may be implemented a processor 402 and memory 404 as described below with respect to FIG. 4. The system 200 further includes first logic 206 stored in the memory 204 and executable by the processor 202 to cause the processor 202 to augment the first financial message with a first identifier known to the first market participant and unique to the first financial message among at least the plurality of financial messages, the first market participant's knowledge of the first identifier being operative to allow identification of the first financial message by the first market participant as being associated therewith, wherein other market participants of the plurality of market participants lacking knowledge of the association of the first identifier with the first market participant thereby being unable to identify the first financial messages as being associated therewith. The system 200 further includes second logic 208 stored in the memory 204 and executable by the processor 202 to cause the processor 202 to transmit, via the network 214, the first financial message to the plurality of market participants. The first request message may include a trade order, trade modification, trade cancellation, or combination thereof, and the first financial message comprises a confirmation message, update message, rejection message, or combination thereof. In one embodiment, the first request message may include the first identifier. In one embodiment, the first financial message may include data representative of a change in a market, such as one of a confirmation, quote, trade, order, statistical value, price, or combination thereof. The first identifier may permit the first market participant to characterize the first financial message with respect to the first request.

In one embodiment, the first logic 206 may be further executable to cause the processor 202 to generate a first plurality of identifiers, each of the first plurality of identifiers being unique at least among the first plurality of identifiers, and allocate the first plurality of identifiers to the first market participant such that the first plurality of identifiers are known thereto. Each of the first plurality of identifiers may be further characterized as having no relationship with any other of the first plurality of identifiers discernable by any of the plurality of market participants lacking knowledge of the allocation. In one embodiment, the first plurality of identifiers may be randomly generated, the first plurality of identifiers may be randomly allocated, or combinations thereof. In one embodiment, each of the first plurality of identifies may only be used with one of the plurality of financial messages.

In one embodiment, the first logic 206 may be further executable to cause the processor 202 to receive the first request message from the first market participant, the first financial message being related thereto, the first request message including the first identifier selected from the first plurality of identifiers and wherein the first logic is further executable to cause the processor to obtain the first identifier from the request message. In particular, the first logic 206 may be further executable to cause the processor 202 to, prior to the receipt of the first request message, provide the allocated first plurality of identifiers to the first market participant to allow the first market participant to select the first identifier from the first plurality of identifiers and include the first identifier in the first request message. Wherein the number of identifiers in the first plurality of identifiers is limited, each of the plurality of identifiers may only be used once, wherein the first logic 206 may be further executable to cause the processor 202 to determine if the first request message includes one of the plurality of identifiers not previously included in a prior request message and reject the first request message if it does not include one of the plurality of identifiers not previously used in a prior request message.

In an alternative embodiment, the first logic 206 may be further executable to cause the processor 202 to select the first identifier from the first plurality of identifiers. In particular, the first logic 206 may be further executable to cause the processor 202 to, prior to the transmission of the first financial message, provide the allocated first plurality of identifiers to the first market participant to allow, upon receipt of the first financial message, the first market participant to determine that the first plurality of identifiers includes the first identifier.

In one embodiment, the first logic 206 is further executable to cause the processor 202 to generate a second plurality of identifiers, each of the second plurality of identifiers being unique at least among the first and second plurality of identifiers, allocate the second plurality of identifiers to a second market participant of the plurality of market participants such that the second plurality of identifiers are known thereto, select a second identifier from the second plurality of identifiers, and augment a second financial message of the plurality of financial messages with the second identifier known to the second market participant and unique to the second financial message among at least the plurality of financial messages, the second market participant's knowledge of the second identifier being operative to allow identification of the second financial message by the second market participant as being associated therewith, wherein other market participants of the plurality of market participants lacking knowledge of the association of the second identifier with the second market participant thereby being unable to identify the second financial messages as being associated therewith.

Alternatively, the first logic 206 may be further executable to cause the processor 202 to generate a second plurality of identifiers, each of the second plurality of identifiers being unique at least among the first and second plurality of identifiers, allocate the second plurality of identifiers to a second market participant of the plurality of market participants such that the second plurality of identifiers are known thereto, receive a second request message from the second market participant, the second request message including a second identifier selected from the second plurality of identifiers, obtain the second identifier from the second request message, and augment a second financial message, of the plurality of financial messages, related to the request message with the second identifier known to the second market participant and unique to the second financial message among at least the plurality of financial messages, the second market participant's knowledge of the second identifier being operative to allow identification of the second financial message by the second market participant as being associated therewith, wherein other market participants of the plurality of market participants lacking knowledge of the association of the second identifier with the second market participant thereby being unable to identify the second financial messages as being associated therewith.

In one embodiment, the first request may further include an encryption key, the first logic 206 being further executable to cause the processor 202 to encrypt data identifying the first market participant, the first request or a combination thereof using the encryption key, the first identifier comprising the encrypted data. Alternatively, or in addition thereto, wherein the first request further includes an encryption key, the first logic 206 being further executable to cause the processor 202 to encrypt additional data specific to the first market participant, the first request or a combination thereof and augment the first financial message with the encrypted additional data in addition to the first identifier.

In one embodiment, the first logic 206 is further executable to cause the processor 202 to augment a second financial message of the plurality of financial messages with a second identifier unknown to any of the plurality of market participants and unique to the second financial messages among at least the plurality of financial messages, each of the plurality of market participants being unaware of the other of the market participants having no knowledge of the second identifier, the association of the first identifier with first market participant being further obfuscated thereby.

Figure 3:
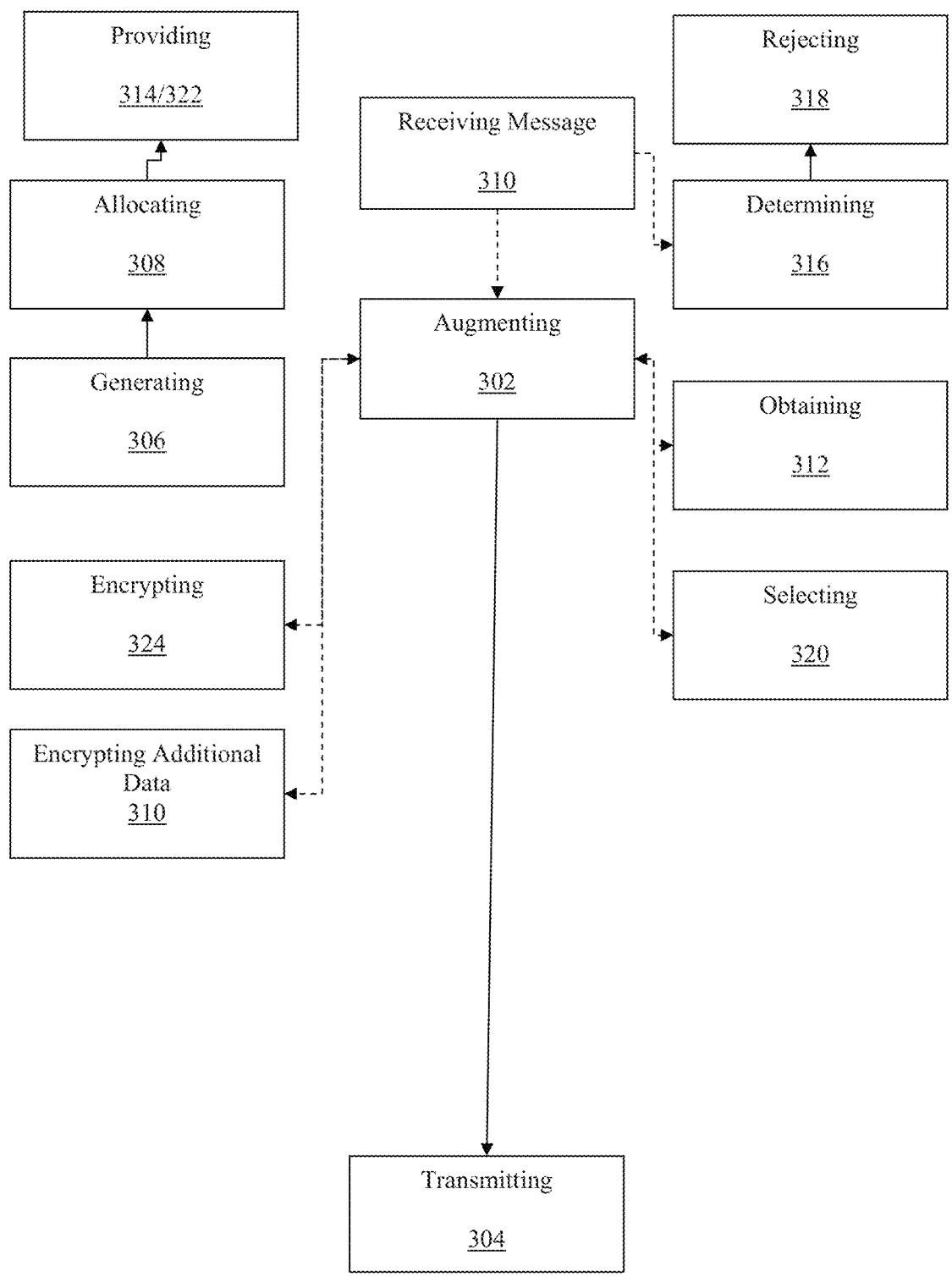
FIG. 3 depicts a flow chart showing operation of the system of FIGS. 1 and 2.

FIG. 3 depicts a flow chart showing operation of the system 200 of FIG. 2. In particular FIG. 3 shows a computer implemented method for managing communication a plurality of financial messages to a plurality of market participants via a network 214 wherein the plurality of messages may include a first financial message responsive to a first request message previously received from a first market participant, the first financial message including data intended to be received by the plurality of market participants, the first financial message intended to be identified by at least the first market participant of the plurality of market participants as being associated therewith and responsive to the first request message, the other market participants of the plurality of market participants being unable to identify the first market participant or the association of the first financial message therewith. The operation includes: augmenting, by a processor 202, the first financial message with a first identifier known to the first market participant and unique to the first financial message among at least the plurality of financial messages, the first market participant's knowledge of the first identifier being operative to allow identification of the first financial message by the first market participant as being associated therewith, wherein other market participants of the plurality of market participants lacking knowledge of the association of the first identifier with the first market participant thereby being unable to identify the first financial messages as being associated therewith (block 302); and transmitting, by the processor 202 via the network 214, the first financial message to the plurality of market participants (block 304). In one embodiment, the first request message may include the first identifier. In one embodiment, the first request message may include a trade order, trade modification, trade cancellation, or combination thereof, and the first financial message comprises a confirmation message, update message, rejection message, or combination thereof. In one embodiment, the first financial message may include data representative of a change in a market, such as one of a confirmation, quote, trade, order, statistical value, price, or combination thereof. The first identifier may permit the first market participant to characterize the first financial message with respect to the first request.

In one embodiment, the operation of the system 200 further includes generating, by the processor 202, a first plurality of identifiers, each of the first plurality of identifiers being unique at least among the first plurality of identifiers (block 306); and allocating, by the processor 202, the first plurality of identifiers to the first market participant such that the first plurality of identifiers are known thereto (block 308). In one embodiment, each of the first plurality of identifiers may be further characterized as having no relationship with any other of the first plurality of identifiers discernable by any of the plurality of market participants lacking knowledge of the allocation.

In one embodiment, the operation of the system 200 further includes receiving the first request message from the first market participant, the first financial message being related thereto, the first request message including the first identifier selected from the first plurality of identifiers (block 310) and wherein the augmenting further comprises obtaining, by the processor 202, the first identifier from the request message (block 312). In one embodiment, the operation of the system 200 further includes, prior to the receiving, providing the allocated first plurality of identifiers to the first market participant to allow the first market participant to select the first identifier from the first plurality of identifiers and include the first identifier in the first request message (block 314).

In one embodiment wherein each of the plurality of identifiers may only be used once, such as where the number of identifiers in the first plurality of identifiers is limited, the operation of the system 200 may further include determining if the first request message includes one of the plurality of identifiers not previously included in a prior request message (block 316) and rejecting the first request message if it does not include one of the plurality of identifiers not previously used in a prior request message (block 318).

In one embodiment, the augmenting may further include selecting, by the processor, the first identifier from the first plurality of identifiers (block 320). The operation of the system 200 may further include, prior to the transmitting, providing the allocated first plurality of identifiers to the first market participant to allow, upon receipt of the first financial message, the first market participant to determine that the first plurality of identifiers includes the first identifier (block 322).

In one embodiment, the operation of the system 200 further includes: generating, by the processor 202, a second plurality of identifiers, each of the second plurality of identifiers being unique at least among the first and second plurality of identifiers (block 306); and allocating, by the processor 202, the second plurality of identifiers to a second market participant of the plurality of market participants such that the second plurality of identifiers are known thereto (block 308); and wherein the augmenting further comprises selecting, by the processor 202, a second identifier from the second plurality of identifiers and augmenting, by the processor a second financial message of the plurality of financial messages with the second identifier known to the second market participant and unique to the second financial message among at least the plurality of financial messages, the second market participant's knowledge of the second identifier being operative to allow identification of the second financial message by the second market participant as being associated therewith, wherein other market participants of the plurality of market participants lacking knowledge of the association of the second identifier with the second market participant thereby being unable to identify the second financial messages as being associated therewith (block 302).

In one embodiment, the operation of the system 200 further includes: generating, by the processor 202, a second plurality of identifiers, each of the second plurality of identifiers being unique at least among the first and second plurality of identifiers (block 306); and allocating, by the processor 202, the second plurality of identifiers to a second market participant of the plurality of market participants such that the second plurality of identifiers are known thereto (block 308); receiving a second request message from the second market participant, the second request message including a second identifier selected from the second plurality of identifiers (block 310); and wherein the augmenting further comprises obtaining, by the processor 202, the second identifier from the second request message and augmenting, by the processor 202 a second financial message, of the plurality of financial messages, related to the request message with the second identifier known to the second market participant and unique to the second financial message among at least the plurality of financial messages, the second market participant's knowledge of the second identifier being operative to allow identification of the second financial message by the second market participant as being associated therewith, wherein other market participants of the plurality of market participants lacking knowledge of the association of the second identifier with the second market participant thereby being unable to identify the second financial messages as being associated therewith (block 302).

In one embodiment, the first plurality of identifiers may be randomly generated, the first plurality of identifiers are randomly allocated, or combinations thereof. Further, in one embodiment, each of the first plurality of identifiers may only be used with one of the plurality of financial messages, i.e. each identifier ma may only be used once.

In one embodiment wherein the first request further includes an encryption key, the augmenting may further include encrypting data identifying the first market participant, the first request or a combination thereof using the encryption key, the first identifier comprising the encrypted data (block 324).

Alternatively, or in addition thereto where the first request further includes an encryption key, the augmenting may further include encrypting additional data specific to the first market participant, the first request or a combination thereof and augmenting the first financial message with the encrypted additional data in addition to the first identifier (block 302).

In one embodiment, the operation of the system 200 may further include augmenting a second financial message of the plurality of financial messages with a second identifier unknown to any of the plurality of market participants and unique to the second financial messages among at least the plurality of financial messages, each of the plurality of market participants being unaware of the other of the market participants having no knowledge of the second identifier, the association of the first identifier with first market participant being further obfuscated thereby (block 302).

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
   managing, by a processor, anonymized communication of a plurality of financial messages to a plurality of market participants via a network, the plurality of messages including a first financial message responsive to a first request message previously received from a first market participant, the first financial message including data representative of a change in a market generated to be received and comprehended by the plurality of market participants, the first financial message generated to be identified by at least the first market participant of the plurality of market participants as being associated therewith and responsive to the first request message, the other market participants of the plurality of market participants being unable to identify the first market participant or the association of the first financial message therewith;

generating, by the processor, a first plurality of identifiers, each of the first plurality of identifiers being unique at least among the first plurality of identifiers, and allocating the first plurality of identifiers to the first market participant, the allocation of each of the first plurality of identifiers to the first market participant being discernible thereby and not by any of the other market participants, and further the inclusion of each of the first plurality of identifiers as being in the same allocation being not discernible from any other of the first plurality of identifiers by any of the other market participants;

augmenting, by a processor, the first financial message with a first identifier of the first plurality of identifiers, the first identifier being unique to the first financial message among at least the plurality of financial messages, that indicates that the data representative of the change in the market of the first financial message is responsive to the first request message, the indication that the data representative of the change in the market is responsive to the first request message being discernible by the first market participant but not discernible by other market participants of the plurality of market participants, the data representative of the change in the market of the augmented first financial message being discernible by both the first market participant and the others of the plurality of market participants; and transmitting, by the processor via the network, the augmented first financial message to the plurality of market participants in lieu of transmitting a second financial message responsive to the first request message only to the first market participant.

2. The computer implemented method of claim 1 where the first request message includes the first identifier.

3. The computer implemented method of claim 1 where the first request message comprises a trade order, trade modification, trade cancellation, or combination thereof, and the first financial message comprises a confirmation message, update message, rejection message, or combination thereof.

4. The computer implemented method of claim 1 further comprising receiving the first request message from the first market participant, the first financial message being related thereto, the first request message including the first identifier selected from the first plurality of identifiers and where the augmenting further comprises obtaining, by the processor, the first identifier from the request message.

5. The computer implemented method of claim 4 where, prior to the receiving, providing the allocated first plurality of identifiers to the first market participant where the first market participant selects the first identifier from the first plurality of identifiers and include the first identifier in the first request message.

6. The computer implemented method of claim 4 where the number of identifiers in the first plurality of identifiers is limited, each of the plurality of identifiers is only used once, the method further comprising determining if the first request message includes one of the plurality of identifiers not previously included in a prior request message and rejecting the first request message if it does not include one of the plurality of identifiers not previously used in a prior request message.

7. The computer implemented method of claim 1 where the augmenting further comprises selecting, by the processor, the first identifier from the first plurality of identifiers.

8. The computer implemented method of claim 7 where, prior to the transmitting, providing the allocated first plurality of identifiers to the first market participant which, upon receipt of the first financial message, the first market participant determines that the first plurality of identifiers includes the first identifier.

9. The computer implemented method of claim 1 further comprising:

generating, by the processor, a second plurality of identifiers, each of the second plurality of identifiers being unique at least among the first and second plurality of identifiers; and allocating, by the processor, the second plurality of identifiers to a second market participant of the plurality of market participants where the allocation of each of the second plurality of identifiers to the second market participant is discernible thereby and not by any of the other market participants; and where the augmenting further comprises selecting, by the processor, a second identifier from the second plurality of identifiers and augmenting, by the processor a second financial message of the plurality of financial messages, which includes data responsive to a second request message received from the second market participant, with the second identifier unique to the second financial message among at least the plurality of financial messages that indicates that the data of the second financial message is responsive to the second request message from the second market participant, the indication discernable by the second market participant but not discernible to other market participants of the plurality of market participants, the data of the augmented second financial message being discernable by both the second market participant and the others of the plurality of market participants.

10. The computer implemented method of claim 1 further comprising:

generating, by the processor, a second plurality of identifiers, each of the second plurality of identifiers being unique at least among the first and second plurality of identifiers; and allocating, by the processor, the second plurality of identifiers to a second market participant of the plurality of market participants where the allocation of each of the second plurality of identifiers to the second market participant is discernible thereby and not by any of the other market participants;

receiving a second request message from the second market participant, the second request message including a second identifier selected from the second plurality of identifiers; and where the augmenting further comprises obtaining, by the processor, the second identifier from the second request message and augmenting, by the processor a second financial message of the plurality of financial messages, which includes data responsive to a second request message received from the second market participant, with the second identifier unique to the second financial message among at least the plurality of financial messages that indicates that the data of the second financial message is responsive to the second request message from the second market participant, the indication discernable by the second market participant but not discernible to other market participants of the plurality of market participants, the data of the augmented second financial message being discernable by both the second market participant and the others of the plurality of market participants.

11. The computer implemented method of claim 1 where the first plurality of identifiers are randomly generated, the first plurality of identifiers are randomly allocated, or combinations thereof.

12. The computer implemented method of claim 1 where each of the first plurality of identifiers is only used with one of the plurality of financial messages.

13. The computer implemented method of claim 1 where the first financial message comprises one of a confirmation, quote, trade, order, statistical value, price, or combination thereof.

14. The computer implemented method of claim 1 where the first identifier is used by the first market participant to characterize the first financial message with respect to the first request.

15. The computer implemented method of claim 1 where the first request further includes an encryption key, the augmenting further comprising encrypting data identifying the first market participant, the first request or a combination thereof using the encryption key, the first identifier comprising the encrypted data.

16. The computer implemented method of claim 1 where the first request further includes an encryption key, the augmenting further comprising encrypting additional data specific to the first market participant, the first request or a combination thereof and augmenting the first financial message with the encrypted additional data in addition to the first identifier.

17. The computer implemented method of claim 1 further comprising augmenting a second financial message of the plurality of financial messages with a second identifier having no association to any of the plurality of market participants and unique to the second financial message among at least the plurality of financial messages, each of the plurality of market participants lacking information indicating a lack of association of the second identifier to any of the other of the market participants, the association of the first identifier with the first market participant being further obfuscated thereby.

18. The system of claim 1 where the first financial message comprises one of a confirmation, quote, trade, order, statistical value, price, or combination thereof.

19. A system comprising:
an exchange computer system including a processor configured to manage anonymized communication of a plurality of financial messages to a plurality of market participants via a network coupled with the processor, the plurality of messages including a first financial message responsive to a first request message previously received from a first market participant, the first financial message including data representative of a change in a market generated to be received and comprehended by the plurality of market participants, the first financial message generated to be identified by at least the first market participant of the plurality of market participants as being associated therewith and responsive to the first request message, the other market participants of the plurality of market participants being unable to identify the first market participant or the association of the first financial message therewith;
first logic stored in the memory and that is executed by the processor that causes the processor to generate a first plurality of identifiers, each of the first plurality of identifiers being unique at least among the first plurality of identifiers, and allocate the first plurality of identifiers to the first market participant, the allocation of each of the first plurality of identifiers to the first market participant being discernible thereby and not by any of the other market participants, and further the inclusion of each of the first plurality of identifiers as being in the same allocation being not discernible from any other of the first plurality of identifiers by any of the other market participants, the first logic being further executed by the processor that causes the processor to augment the first financial message with a first identifier of the first plurality of identifiers, the first identifier being unique to the first financial message among at least the plurality of financial messages that indicates that the data representative of a change in a market of the first financial message is responsive to the first request message, the indication that the data representative of the change in the market is responsive to the first request message being discernible by the first market participant but not discernible by other market participants of the plurality of market participants, the data representative of a change in a market of the augmented first financial message being discernible by both the first market participant and the others of the plurality of market participants; and
second logic stored in the memory and that is executed by the processor that causes the processor to transmit, via the network, the augmented first financial message to the plurality of market participants in lieu of transmission of a second financial message responsive to the first request message only to the first market participant.

20. The system of claim 19 where the first request message includes the first identifier.

21. The system of claim 19 where the first request message comprises a trade order, trade modification, trade cancellation, or combination thereof, and the first financial message comprises a confirmation message, update message, rejection message, or combination thereof.

22. The system of claim 19 where the first logic is further executed that causes the processor to receive the first request message from the first market participant, the first financial message being related thereto, the first request message including the first identifier selected from the first plurality of identifiers and where the first logic is further executed that causes the processor to obtain the first identifier from the request message.

23. The system of claim 22 where the first logic is further executed that causes the processor to, prior to the receipt of the first request message, provide the allocated first plurality of identifiers to the first market participant where the first market participant selects the first identifier from the first plurality of identifiers and includes the first identifier in the first request message.

24. The system of claim 22 where the number of identifiers in the first plurality of identifiers is limited, each of the plurality of identifiers is only used once, where the first logic is further executed that causes the processor to determine if the first request message includes one of the plurality of identifiers not previously included in a prior request message and reject the first request message if it does not include one of the plurality of identifiers not previously used in a prior request message.

25. The system of claim 19 where the first logic is further executed that causes the processor to select the first identifier from the first plurality of identifiers.

26. The system of claim 25 where the first logic is further executed that causes the processor to, prior to the transmission of the first financial message, provide the allocated first plurality of identifiers to the first market participant which, upon receipt of the first financial message, the first market participant determines that the first plurality of identifiers includes the first identifier.

27. The system of claim 19 where the first logic is further executed that causes the processor to generate a second plurality of identifiers, each of the second plurality of identifiers being unique at least among the first and second plurality of identifiers, allocate the second plurality of identifiers to a second market participant of the plurality of market participants where the allocation of each of the second plurality of identifiers to the second market participant is discernible thereby and not by any of the other market participants, select a second identifier from the second plurality of identifiers, and augment a second financial message of the plurality of financial messages, which includes data responsive to a second request message received from the second market participant, with the second identifier unique to the second financial message among at least the plurality of financial messages that indicates that the data of the second financial message is responsive to the second request message from the second market participant, the indication discernable by the second market participant but not discernible to other market participants of the plurality of market participants, the data of the augmented second financial message being discernable by both the second market participant and the others of the plurality of market participants.

28. The system of claim 19 where the first logic is further executed that causes the processor to generate a second plurality of identifiers, each of the second plurality of identifiers being unique at least among the first and second plurality of identifiers, allocate the second plurality of identifiers to a second market participant of the plurality of market participants where the allocation of each of the second plurality of identifiers to the second market participant is discernible thereby and not by any of the other market participants, receive a second request message from the second market participant, the second request message including a second identifier selected from the second plurality of identifiers, obtain the second identifier from the second request message, and augment a second financial message, of the plurality of financial messages, which includes data responsive to a second request message received from the second market participant, with the second identifier unique to the second financial message among at least the plurality of financial messages that indicates that the data of the second financial message is responsive to the second request message from the second market participant, the indication discernable by the second market participant but not discernible to other market participants of the plurality of market participants, the data of the augmented second financial message being discernable by both the second market participant and the others of the plurality of market participants.

29. The system of claim 19 where the first plurality of identifiers are randomly generated, the first plurality of identifiers are randomly allocated, or combinations thereof.

30. The system of claim 19 where each of the first plurality of identifiers is only able to be used with one of the plurality of financial messages.

31. The system of claim 19 where the first identifier is used by the first market participant to characterize the first financial message with respect to the first request.

32. The system of claim 19 where the first request further includes an encryption key, the first logic being further executed that causes the processor to encrypt data identifying the first market participant, the first request or a combination thereof using the encryption key, the first identifier comprising the encrypted data.

33. The system of claim 19 where the first request further includes an encryption key, the first logic being further executed that causes the processor to encrypt additional data specific to the first market participant, the first request or a combination thereof and augment the first financial message with the encrypted additional data in addition to the first identifier.

34. The system of claim 19 where the first logic is further executed that causes the processor to augment a second financial message of the plurality of financial messages with a second identifier having no association to any of the plurality of market participants and unique to the second financial message among at least the plurality of financial messages, each of the plurality of market participants lacking information indicating a lack of association of the second identifier to any of the other of the market participants, the association of the first identifier with first market participant being further obfuscated thereby.

35. A non-transitory computer readable medium having instructions stored thereon that causes the computer to:
communicate, anonymously, a plurality of financial messages to a plurality of market participants via a network, the plurality of messages including a first financial message responsive to a first request message previously received from a first market participant, the first financial message including data representative of a change in a market generated to be received and comprehended by the plurality of market participants, the first financial message generated to be identified by at least the first market participant of the plurality of market participants as being associated therewith and responsive to the first request message, the other market participants of the plurality of market participants being unable to identify the first market participant or the association of the first financial message;
generate a first plurality of identifiers, each of the first plurality of identifiers being unique at least among the first plurality of identifiers, and allocate the first plurality of identifiers to the first market participant, the allocation of each of the first plurality of identifiers to the first market participant being discernible thereby and not by any of the other market participants, and further the inclusion each of the first plurality of identifiers as being in the same allocation being not discernible from any other of the first plurality of identifiers by any of the other market participants;
augment the first financial message with a first identifier of the first plurality of identifiers, the first identifier being unique to the first financial message among at least the plurality of financial messages, that indicates that the data representative of a change in a market of the first financial message is responsive to the first request message, the indication that the data representative of the change in the market is responsive to the first request message being discernible by the first market participant but not discernible by other market participants of the plurality of market participants, the data representative of a change in a market of the augmented first financial message being discernible by both the first market participant and the others of the plurality of market participants; and transmit, via the network, the augmented first financial message to the plurality of market participants in lieu of transmission of a second financial message responsive to the first request message only to the first market participant.

* * * * *